United States Patent [19]

Hagino

[11] Patent Number: 5,448,305

[45] Date of Patent: Sep. 5, 1995

[54] COMB FILTER CAPABLE OF REDUCING CROSS-COLOR PHENOMENA AND NOISES

[75] Inventor: Hideyuki Hagino, Kumagaya, Japan

[73] Assignee: Kabushiki Kaisha Toshiba, Kawasaki, Japan

[21] Appl. No.: 219,347

[22] Filed: Mar. 29, 1994

[30] Foreign Application Priority Data

Mar. 30, 1993 [JP] Japan .................................. 5-072259

[51] Int. Cl.⁶ ............................................. H04N 9/78
[52] U.S. Cl. .................................. 348/665; 348/666; 348/609
[58] Field of Search ............... 348/234, 609, 610, 608, 348/665, 666, 667, 668; 358/31; H04N 9/64, 9/77, 9/78

[56] References Cited

U.S. PATENT DOCUMENTS 4,143,397  3/1979  Holmes ................................ 348/667
4,571,639  2/1986  Nagashima .
4,737,862  4/1988  Koga .

FOREIGN PATENT DOCUMENTS 55-82583  6/1980  Japan .
2-10993   1/1990  Japan .

OTHER PUBLICATIONS

Patent Abstracts of Japan, vol. 7, No. 229 (E-203), Oct. 12, 1983, JP-A-58 117 790, Jul. 13, 1983.

Primary Examiner—James J. Groody
Assistant Examiner—Sherrie Hsia
Attorney, Agent, or Firm—Oblon, Spivak, McClelland, Maier & Neustadt

[57] ABSTRACT

An input of a charge coupled device (CCD) delay element is an additional signal of a reproduced luminance signal and a reproduced chrominance signal, while an output of the CCD delay element is separated by an LPF and a BPF into a delayed luminance signal and a delayed chrominance signal, thereby constituting a comb filter by using the input signal before an addition and delayed/reproduced signals. Accordingly, it is unnecessary to provide a filter for limiting a band width, which is inserted into a main signal path. Furthermore, since it is possible to constitute a comb filter which does not narrow a signal band width of the reproduced luminance signal and the reproduced chrominance signal, there can be provided a comb filter for removing a cross-talk and noises and which does not narrow a signal band width of the luminance signal and the chrominance signal.

7 Claims, 5 Drawing Sheets

COMB FILTER CAPABLE OF REDUCING CROSS-COLOR PHENOMENA AND NOISES

BACKGROUND OF THE INVENTION

The present invention relates to a comb filter for separating a color signal and a luminance signal from a color image signal, and more specifically, to an improvement of a color comb filter for removing a cross color and a luminance comb filter for removing noises in reproducing.

There will be described a conventional comb filter for extracting a luminance signal and a color signal from an image signal with reference to FIG. 1.

Numerals 1-4 shown in FIG. 1 denote first and second input terminals and first and second output terminals, respectively.

In FIG. 1, an adder 5 superposes a reproduced luminance signal $S_a$ through the first input terminal 1 and a reproduced chrominance signal $S_b$ through the second input terminal 2, both of which are demodulated by a video tape recorder (VTR) or a television receiver which is not shown in the figure to generate an image signal $S_c$. The image signal $S_c$ is supplied through a charge coupled device (CCD) delay element 6 and a low pass filter 7 to one of input terminals of a subtracter 8 as a delayed image signal $S_d$. The low pass filter 7 removes a CCD clock component included in the delayed image signal. The image signal $S_c$ is supplied to the other terminal of the subtracter 8 to obtain a chrominance signal $S_e$ as an output thereof. The chrominance signal $S_e$ is supplied to a band pass filter 9 which removes non-correlative components from the chrominance signal $S_e$ to generate a processed color signal $S_f$. Furthermore, the chrominance signal $S_e$ is also supplied through a limiter 10 to an amplifier 11 which reduce an error by the non-correlation of the luminance signal, thereby outputting an amplified color signal $S_g$ to one of input terminals of a subtracter 12. The image signal $S_c$ is supplied to the other input terminal of the subtracter 12 for outputting a video signal $S_h$ of which noise components of the luminance signal is offset. The video signal $S_h$ is supplied to a low pass filter 13 which removes color signal components, thereby outputting a processed luminance signal $S_i$. The processed luminance signal $S_i$ is outputted through the first output terminal 3, and the processed chrominance signal $S_f$ is outputted through the second output terminal 4.

Next, there is described a signal processing in the conventional example as shown in FIG. 1 in accordance with FIGS. 2A-2I which show signal waveforms of respective portions in the comb filter, respectively.

FIG. 2A shows a waveform of the reproduced luminance signal $S_a$, and FIG. 2B shows a waveform of the reproduced chrominance signal $S_b$. The noise components are included in the reproduced luminance signal $S_a$. Both of the signals $S_a$ and $S_b$ are added with each other to be the image signal $S_c$ as shown in FIG. 2C. The image signal $S_c$ is delayed by the CCD delay element 6 for a 1H (a time corresponding to one horizontal scanning) to be the delayed image signal $S_d$ as shown in FIG. 2D. When the signals are used in a National Television System Committee (NTSC) color system, a phase of the color signal is inverted with 180 degrees every 1H. Accordingly, a subtraction between the image signal $S_c$ and the delayed image signal $S_d$ delaying for the 1H is shown by the chrominance signal $S_e$ in FIG. 2E because this subtraction represents an addition with respect to the color signal components. Since the comb filter separates the luminance signal and the chrominance signal on the basis that the correlation between adjacent scanning lines is high, a separation accuracy of both signals becomes lower in a portion of a non-correlation. Since the chrominance signal $S_e$ appears as an additional signal of a non-correlative component of the luminance signal (Y) and an output signal of the comb filter, in order to remove the non-correlative component of the luminance signal as shown in FIG. 2E, the additional signal is passed through the band pass filter 9 to generate the processed chrominance signal $S_f$ as shown in FIG. 2F.

Furthermore, the chrominance signal $S_e$ as the output of the subtracter 8 becomes the amplified color signal $S_g$, as shown in FIG. 2G, by passing through the limiter 10 and the amplifier 11, and the subtraction between the amplified color signal $S_g$ and the image signal $S_c$ forms the video signal $S_h$ of which the noises components shown in FIG. 2H are offset. Since the correlation noises in the low frequency band of the luminance signal are removed by the subtraction from the video signal $S_h$, it is possible to form a luminance signal output of the comb filter. However, the video signal $S_h$ has a remaining color signal which is passed through the limiter 10 and amplifier 11, this video signal $S_h$ becomes an output of the comb filter, which is formed by the color signal component superposed with the luminance signal. The color signal component is removed by the low pass filter so as to obtain the processed luminance signal $S_i$ shown in FIG. 2I.

Accordingly, the output signal of the luminance comb filter is always passed through the low pass filter 13, so that the this filter has the problem of causing a band width of the luminance signal to become narrow. Furthermore, the processed color signal $S_f$ is always passed through the band pass filter 9, thereby having the problem of causing a band width of the color signal to become narrow.

As described above, in the conventional comb filter which is considered with the non-correlation of the luminance signal, since the filter (the band pass filter 9 or the low pass filter 13) is contained in the main signal path through which the non-delayed image signal is always passed, it is unsuitable to reduce the band width of the processed color signal and the processed luminance signal.

In order to eliminate the above problem, there is proposed Japanese patent publication No. 5-30117 (1993) [Laid-open No. 3-113987 (1991)] as the prior art of the present invention. A color video signal reproducing circuit desclosed in this publication comprises, as shown in FIG. 3, an adder 5 for adding the reproduced luminance signal $S_a$ with the reproduced chrominance signal $S_b$, a 1H delay line 6 for delaying an added signal $S_c$ for a one horizontal scanning period (1H), a subtracter 8, a band pass filter 9 for outputting the processed chrominance signal $S_f$ after passing through a band of the subtracted signal $S_e$ outputted from the subtracter 8, a low pass filter 7 for passing through a low frequency band of the subtracted signal $S_e$, a limiter 10 for limiting the output of the low pass filter 7, and a subtracter 12 for outputting the processed luminance signal $S_i$ after subtracting the output of the limiter 10 from the reproduced luminance signal $S_a$.

Even though the circuit shown in FIG. 3 does not include the filter circuit in the first main signal path $M_1$, since the filter circuit is not omitted from the second main signal path $M_2$, there is a problem that the band of the chrominance signal must be narrow.

SUMMARY OF THE INVENTION

In view of the above-mentioned condition, an object of the present invention is to provide a comb filter capable of containing no filter (a band pass filter or a low pass filter) in a main signal path, thereby enabling a signal band width of a processed color signal and a processed luminance signal not to become narrow.

In order to achieve the above object, a comb filter circuit according to the present invention includes an adder for adding a reproduced luminance signal and a reproduced chrominance signal with each other to output a reproduced image signal, a delay element for delaying the reproduced image signal for a predetermined time corresponding to one horizontal scanning period to output a delayed image signal, a luminance signal separation filter for separating a luminance signal component from the delayed image signal to output a delayed luminance signal, a color signal separation filter for separating a chrominance signal component from the delayed image signal to output a delayed color signal, a first subtracter for performing a subtraction between the reproduced chrominance signal and the delayed color signal to output a processed color signal, a second subtracter for performing a subtraction between the reproduced luminance signal and the delayed luminance signal to output a luminance difference signal, a limiter for limiting an amplitude of the luminance difference signal to be less than a predetermined level, and a third subtracter for performing a subtraction between the reproduced luminance signal and the luminance difference signal passed through the limiter to output a processed luminance signal.

In the above constitution of the filter according to the present invention, an input of the CCD delay element is an additional signal of the reproduced luminance signal and the reproduced chrominance signal, and an output of the CCD delay element is separated into the delayed luminance signal and the delayed luminance signal and the delayed color signal by the low pass filter and the band pass filter, thereby constituting a comb filter by performing the subtraction between the reproduced luminance signal and the delayed luminance signal and by performing the subtraction between the reproduced chrominance signal and the delayed color signal. Therefore, it is unnecessary to contain in the main signal path the filter for limiting the band width, thereby providing a comb filter which does not reduce the signal band width of the reproduced luminance signal and the reproduced chrominance signal.

As described above since the comb filter circuit according to the present invention does not have the filter in the main signal path, the signal band width of the luminance signal and chrominance signal is not reduced and it is possible to prevent the reduction of the signal to noise ratio (S/N) caused by the limit of the band width. Furthermore, since the low pass filter and the band pass filter also remove together a signal component of a CCD clock which is mixed in the signal while it passes through the CCD delay element, it is possible to eliminate a provision of the low pass filter 3 having an object of the clock elimination in comparison with the conventional filter.

DETAILED DESCRIPTION OF THE PREFERRED EMBODIMENTS

Figure 1:
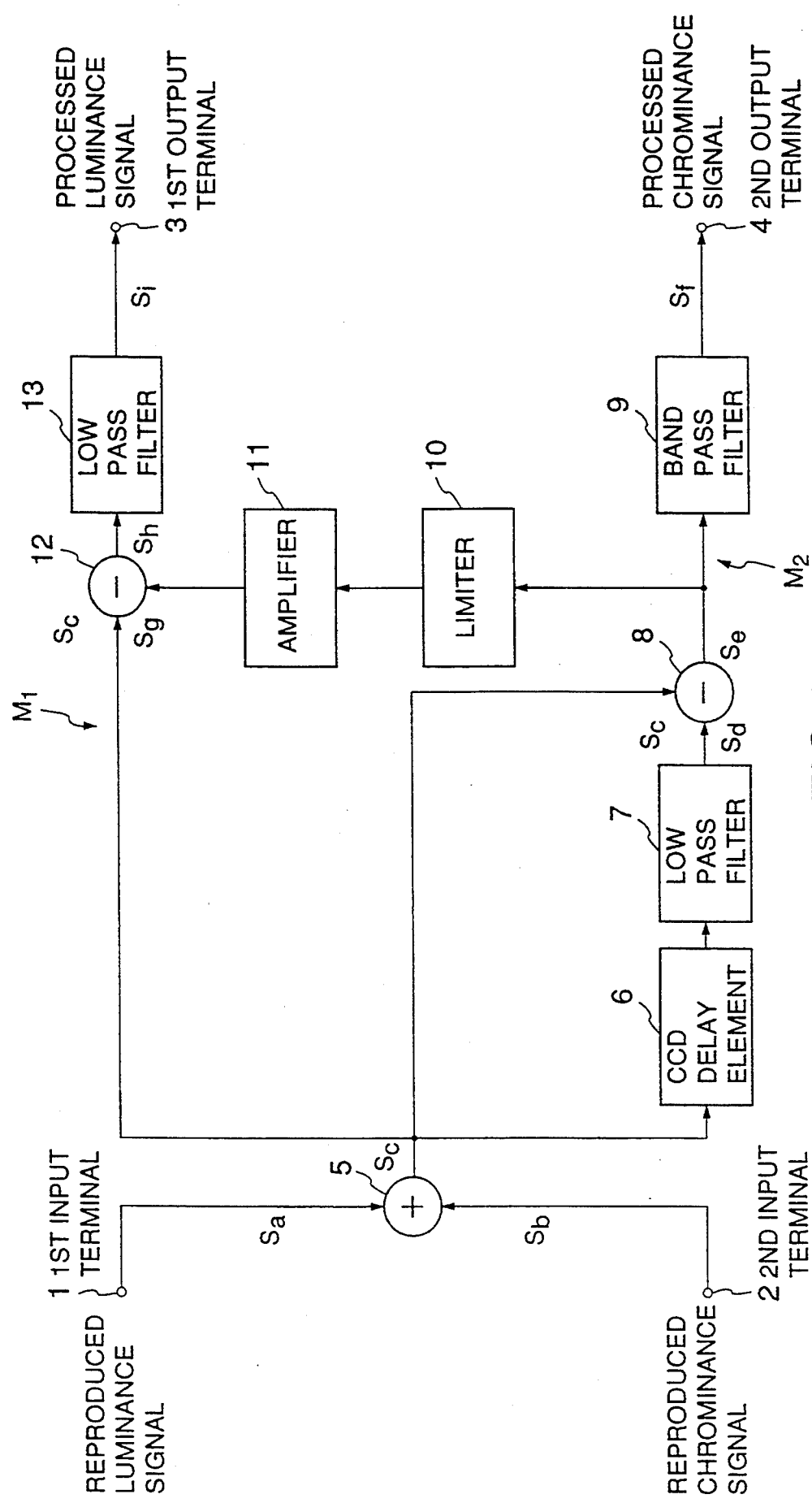
FIG. 1 is a block diagram showing a constitution of the conventional comb filter.
Figure 2A:
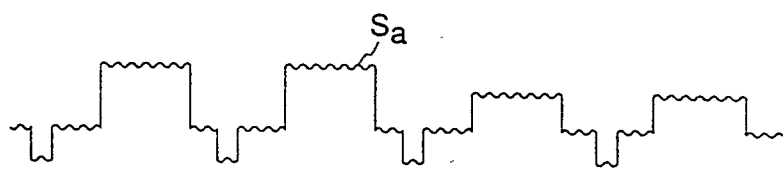
FIGS. 2A through 2I are signal waveform diagrams respectively showing a signal waveform of each portion of the conventional comb filter.
Figure 2B:
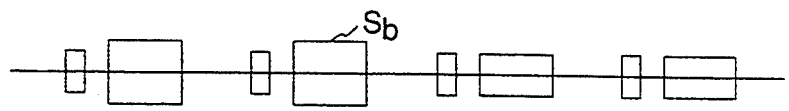
Figure 2C:
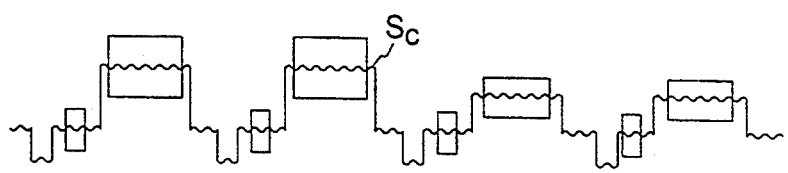
Figure 2D:
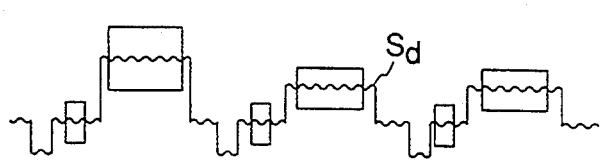
Figure 2E:
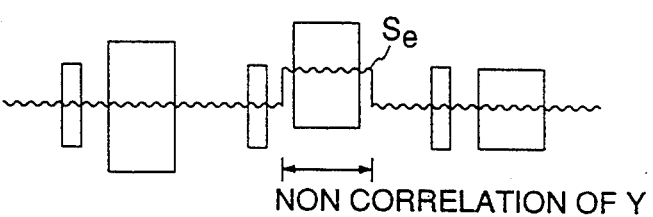
Figure 2F:
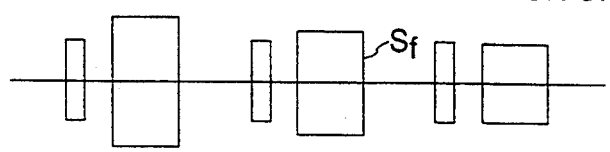
Figure 2G:
Figure 2H:
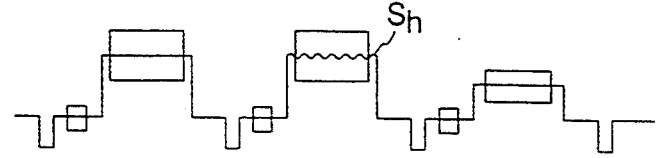
Figure 2I:
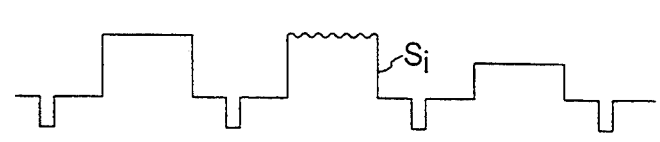
Figure 3:
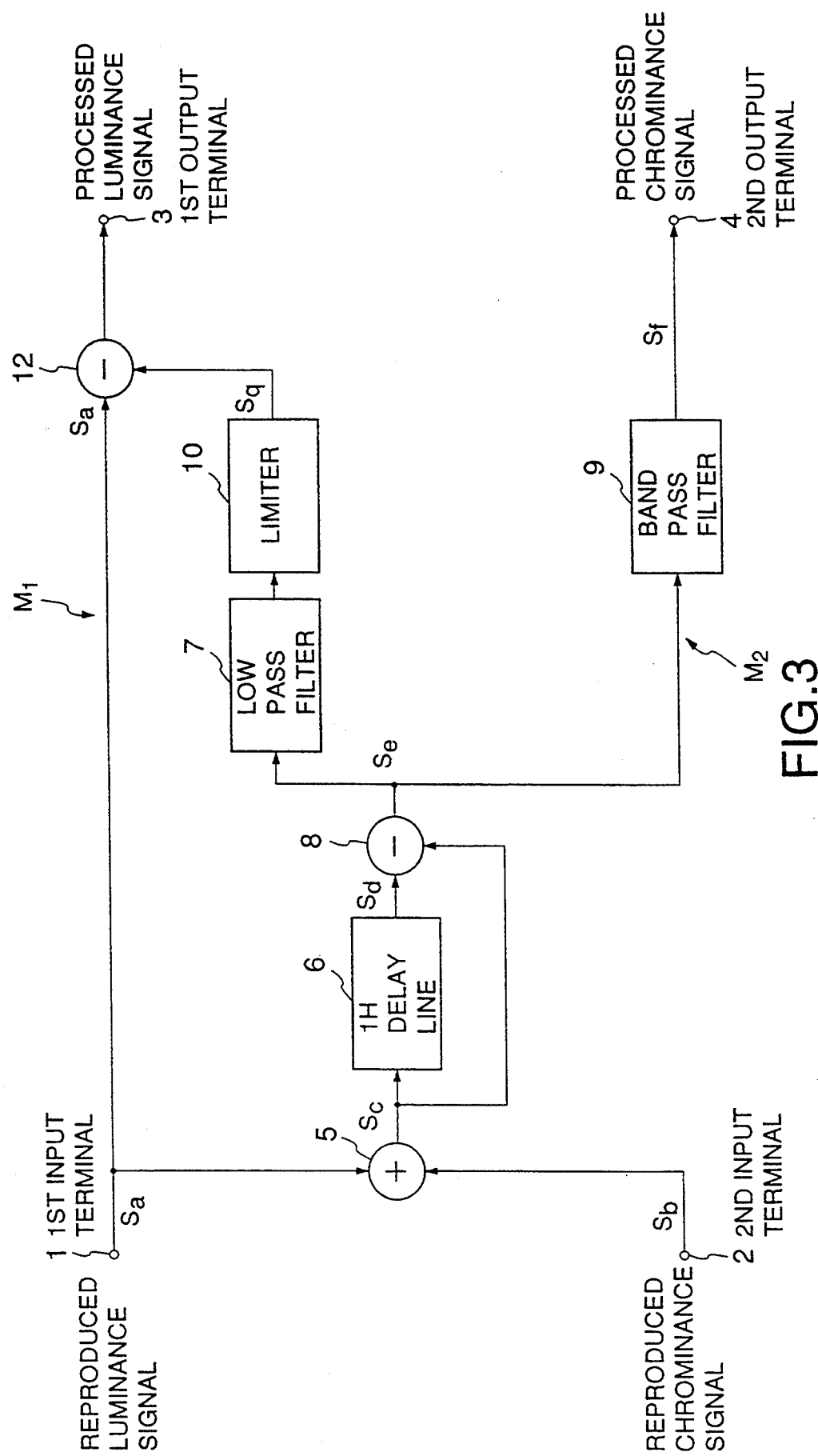
FIG. 3 is a block diagram showing a main portion of the conventional color video Signal reproducing circuit.
Figure 4:
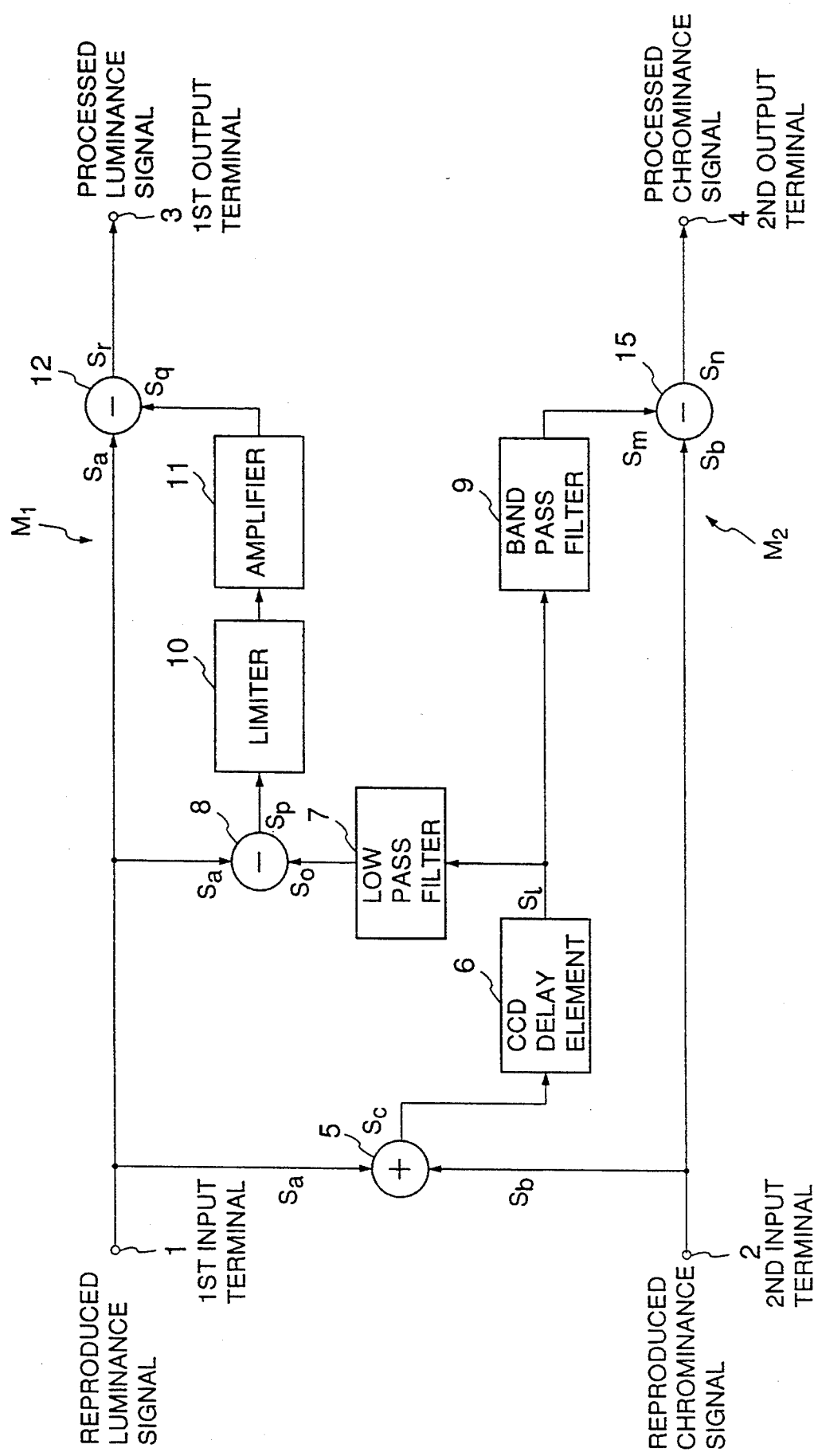
FIG. 4 is a block diagram showing a constitution of a comb filter according to an embodiment of the present invention.

There will be described in detail a comb filter according to a preferred embodiment of the present invention in reference with the attached drawings. FIG. 4 shows a comb filter according to an embodiment of the present invention. Portions of FIG. 4 corresponding to those of FIG. 1 are attached with the same numerals as those in FIG. 1.

A reproduced luminance signal $S_a$ and a reproduced chrominance signal $S_b$ are interposed with each other to form an image signal $S_c$ which becomes a delayed image signal $S_l$ delayed for a predetermined time corresponding to One horizontal scanning period (1H) through a CCD delay element 6. The delayed image signal $S_l$ is supplied to a low pass filter 7 and a band pass filter 9. The low pass filter 7 is a filter for passing through a low frequency band in order to take out a luminance signal component $S_o$ from the delayed image signal $S_l$, and at the same time, also to remove a CCD clock component mixed in the delayed image signal $S_l$. The band pass filter 9 is a filter for passing through the predetermined bans width in order to take out a color signal component $S_m$ from the delayed image signal $S_l$, and at the same time, also to remove the CCD clock component mixed in the delayed image signal $S_l$. The color signal component $S_m$ separated by the band pass filter 9 is subtracted from the reproduced chrominance signal $S_b$ by a subtracter 15. As described above, since the chrominance signal has a phase which is inverted in each horizontal scanning period in the NTSC system, the chrominance signal is taken out as an additional signal because of a subtraction of the inverted signal, thereby generating a processed chrominance signal $S_n$.

On the other hand, the luminance signal component $S_o$ delayed with one horizontal scanning period (1H) and separated by the low pass filter 7, is subtracted from the reproduced luminance signal $S_a$ by a subtracter 8, thereby extracting a non correlation signal $S_p$ having a non correlative component of the luminance signal. The non correlation signal $S_p$ is supplied to one input terminal of a subtracter 12 as a correction signal $S_q$ as shown in FIG. 5H for correcting a luminance signal level through a limiter 10 and an amplifier 11. The reproduced luminance signal $S_a$ is supplied to the other input terminal of the subtracter 12, so as to obtain a processed luminance signal $S_r$ being a signal in which the non correlative noise of the luminance signal is removed.

Figure 5A:
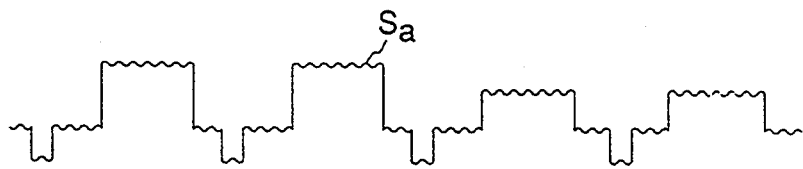
FIGS. 5A through 5I are signal waveform diagrams respectively showing a signal waveform of each portion of the comb filter shown in FIG. 4 according to one example of the present invention.
Figure 5B:
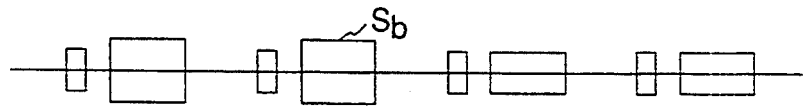
Figure 5C:
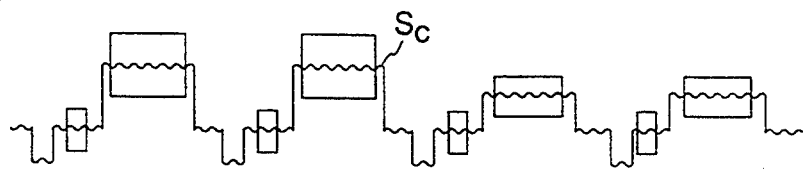
Figure 5D:
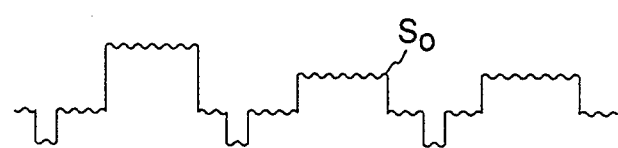
Figure 5E:
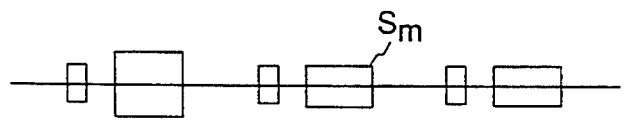
Figure 5F:
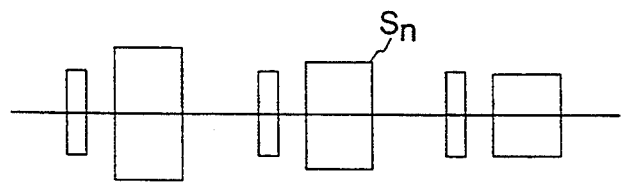
Figure 5G:
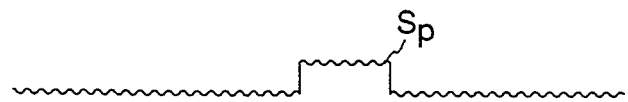
Figure 5H:
Figure 5I:
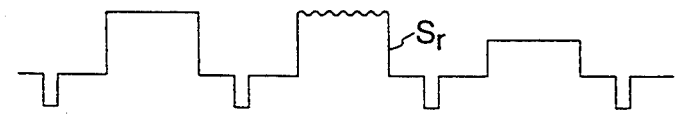

Next there is described signal processing in the above-mentioned comb filter circuit in reference with FIGS. 5A-5I which respectively shod a signal waveform in each portion of the filter circuit shown in FIG. 4. FIG. 5A shows a waveform of a reproduced luminance signal $S_a$ supplied to the comb filter, while FIG. 5B shows a waveform of a reproduced chrominance signal $S_b$ also supplied to the comb filter. The reproduced chrominance signal $S_b$ is superposed on the reproduced luminance signal $S_a$ to generate an image signal $S_c$ shown in FIG. 5C. The image signal $S_c$ is delayed for 1H by the CCD delay element 6 to generate a delayed image signal $S_l$.

A luminance signal component is separated from the delayed image signal $S_l$ by the low-pass filter 7 to obtain a luminance signal $S_o$ shown in FIG. 5D. A chrominance signal component is separated from the delayed image signal $S_l$ by the band pass filter 9 to obtain the chrominance signal $S_m$ shown in FIG. 5E. A calculation by the subtracters 8 and 15 is performed between the reproduced luminance signal $S_a$ and the luminance signal $S_o$, and between the reproduced chrominance signal $S_b$ and the chrominance signal $S_m$, respectively. Since the reproduced luminance signal $S_a$ and the luminance signal $S_o$ do not include the chrominance signal component, the non-correlation signal $S_p$ shown in FIG. 5G as an output of the subtracter 8 neither include the chrominance signal component, thereby eliminating the filter 13 in the first main signal path $M_1$ of the prior art for removing non-correlative component of the chrominance signal component in the luminance signal $S_r$ shown in FIG. 5I. Furthermore, since the reproduced chrominance signal $S_b$ and the chrominance signal $S_m$ do not include the luminance signal component, there is no mixture of the luminance signal component during non-correlation such as the prior art. Accordingly, it is unnecessary to provide the filter 9 in the second main signal path $M_2$ in order to remove the non-correlation component of the luminance signal for the processed chrominance signal $S_n$ shown in FIG. 5F as the output of the subtracter 15.

In this manner, since the filters are not inserted into the main signal paths $M_1$ and $M_2$, especially main signal path $M_2$, through which the reproduced chrominance signal as the non-delayed signal passes, an advantage resides in that a signal band width of the luminance signal and the chrominance signal is not limited. Also, since the luminance comb filter adds a comb filtering to the signal less than 2 MHz, an advantage resides in that the luminance signal is easy robe introduced from the CCD delayed output signal in comparison with the prior art.

What is claimed is:

1. A comb filter comprising:
    an adder for adding a reproduced luminance signal and a reproduced chrominance signal so as to output a reproduced image signal;
    a delay element for delaying said reproduced image signal for a time period corresponding to one horizontal scanning so as to output a delayed image signal;
    a luminance signal separation filter for separating a luminance signal component from said delayed image signal so as to output a delayed luminance signal;
    a chrominance signal separation filter for separating a chrominance signal component from said delayed image signal so as to output a delayed chrominance signal;
    a first subtracter for subtracting said delayed chrominance signal from said reproduced chrominance signal so as to output a processed chrominance signal;
    a second subtracter for subtracting said delayed luminance signal from said reproduced luminance signal so as to output a luminance difference signal;
    a limiter for limiting an amplitude of said luminance difference signal less than a predetermined level; and
    a third subtracter for subtracting said luminance difference signal after passing through said limiter from said reproduced luminance signal so as to output a processed luminance signal.

2. The comb filter according to claim 1, further comprising:
    a first main signal path for receiving said reproduced luminance signal and including only said third subtracter for outputting said processed luminance signal; and
    a second main signal path for receiving said reproduced chrominance signal and including only said first subtracter for outputting said processed chrominance signal.

3. The comb filter according to claim 2, further comprising:
    an amplifier which is provided between said limiter and said third subtracter for amplifying an amplitude limited luminance difference signal which is outputted from said limiter after limiting the amplitude of said luminance difference signal.

4. The comb filter according to claim 1 further comprising:
    a first input terminal for inputting said reproduced luminance signal;
    a second input terminal for inputting said reproduced chrominance signal;
    a first output terminal for outputting said processed luminance signal;
    a second output terminal for outputting said processed chrominance signal;
    a first main signal path extending from said first input terminal to said first output terminal and only including as a component said third subtracter for subtracting said luminance difference signal from said reproduced luminance signal which is supplied through said first input terminal; and
    a second main signal path extending from said second input terminal to said second output terminal and only including as a component said first subtracter for subtracting said delayed chrominance signal from said reproduced chrominance signal which is supplied through said second input terminal.

5. The comb filter according to claim 4, further comprising:
    an amplifier for amplifying said luminance difference signal which is outputted from said limiter and whose amplitude is limited to the predetermined level.

6. The comb filter according to claim 1, wherein:
    said luminance signal separation filter comprises a low pass filter for extracting the luminance signal component from said delayed image signal and for removing a clock component intermixed by said delay element.

7. The comb filter according to claim 1, wherein:
    said chrominance signal separation filter comprises a band pass filter for extracting the chrominance signal component from said delayed image signal and for removing a clock component intermixed by said delay element.

* * * * *